(12) United States Patent  (10) Patent No.: US 6,260,878 B1
Tanase  (45) Date of Patent: Jul. 17, 2001

(54) AIR BAG FOR SIDE AIR BAG DEVICE

(75) Inventor: Toshinori Tanase, Gifu-ken (JP)

(73) Assignee: Toyoda Gosei Co., LTD, Aichi-ken (JP)

( * ) Notice: Subject to any disclaimer, the term of this patent is extended or adjusted under 35 U.S.C. 154(b) by 0 days.

(21) Appl. No.: 09/310,336

(22) Filed: May 12, 1999

(30) Foreign Application Priority Data

May 12, 1998 (JP) ................................................. 10-129266

(51) Int. Cl.⁷ .................................................. B60R 21/22
(52) U.S. Cl. ........................................ 280/730.2; 280/736
(58) Field of Search .................................... 280/739, 736, 280/741, 742, 728.1, 730.2, 749

(56) References Cited

U.S. PATENT DOCUMENTS

| 5,316,336 | * | 5/1994 | Taguchi et al. | 280/730.2 |
| 5,897,929 | * | 4/1999 | Li et al. | 428/36.1 |
| 5,967,550 | * | 10/1999 | Shirk et al. | 280/736 |
| 6,012,738 | * | 1/2000 | Beisswenger | 280/743.1 |
| 6,037,279 | * | 3/2000 | Brookman et al. | 442/71 |
| 6,056,316 | * | 5/2000 | Yamaji et al. | 280/730.2 |
| 6,073,961 | * | 6/2000 | Bailey et al. | 280/760.2 |
| 6,082,761 | * | 7/2000 | Kato et al. | 280/730.2 |

FOREIGN PATENT DOCUMENTS 09240409  9/1997  (JP).
09315253  12/1997  (JP).

* cited by examiner

Primary Examiner—J. J. Swann
Assistant Examiner—David R. Dunn
(74) Attorney, Agent, or Firm—Pillsbury Winthrop LLP

(57) ABSTRACT

An air bag for a side air bag device is folded and accommodated over a roof side rail portion on the peripheral edge of an opening in an interior side of a vehicle. The air bag is developed and expanded to cover the opening when an inflating gas flows in. In the air bag, the internal pressure of the inflating gas at 3 secs after the start of inflow is maintained at 30% or more of the internal pressure at 500 msecs after the start of inflow. This air bag can maintain the high internal pressure for a long time.

7 Claims, 14 Drawing Sheets

AIR BAG FOR SIDE AIR BAG DEVICE

BACKGROUND OF THE INVENTION

1. Field of the Invention

The present invention relates to an air bag for a side air bag device to be mounted on an automobile.

2. Description of the Related Art

In the prior art, an air bag for a side air bag device of this kind is folded and accommodated in the peripheral edge of an opening of a door or window of the interior side of a vehicle (as disclosed in Unexamined Published Japanese Patent Application No. 9-240409 and 9-315253).

In the peripheral edge of the opening on the interior side, there are arranged a pillar portion and a roof side rail portion. As a result, the air bag is accommodated over the pillar portion and the roof side rail portion on the interior side. This air bag is developed and expanded to cover the opening when an inflating gas flows in.

SUMMARY OF THE INVENTION

The air bag for the side air bag device of this kind has been desired to maintain a high internal pressure for a long time. This desire is intended to cope with lateral turns of the vehicle.

An object of the invention is to provide an air bag for a side air bag device, which can maintain a high internal pressure for a long time.

This object is achieved by an air bag having the following construction. The air bag according to the invention is folded and accommodated over a roof side rail portion on the peripheral edge of an opening in an interior side of a vehicle. Further, the air bag is developed and expanded to cover the opening when an inflating gas flows in. In the air bag, moreover, the internal pressure of the inflating gas at 3 secs after the start of inflow is maintained at 30% or more of the internal pressure at 500 msecs after the start of inflow.

Moreover, the air bag is so desirably constructed that the internal pressure at 500 msecs after the start of inflow of the inflating gas is kept at 10 kPa or more.

In the air bag according to the invention, the internal pressure at 3 secs after the start of inflow of the inflating gas is maintained, as the internal pressure after the inflow start, at 30% or more of the internal pressure at 500 msecs after the start of inflow. When the vehicle is laterally turned by an impact or the like from the side of the vehicle, its turn is usually stopped within about 3 secs after the impact is applied. In the air bag of the invention, therefore, the internal pressure of the air bag is sufficiently maintained until the lateral turn of the vehicle stops. As a result, the air bag of the invention can properly restrain the passenger.

If the internal pressure in the air bag at 500 msecs after the inflow start is at 10 kPa or more, moreover, there can be achieved the following effects. Specifically, the internal pressure of the air bag is maintained at 3 kPa or more until 3 secs after the effect of the impact occurs. As a result, the air bag of the invention can suitably restrain the passenger.

DESCRIPTION OF THE PREFERRED EMBODIMENTS

Figure 1:
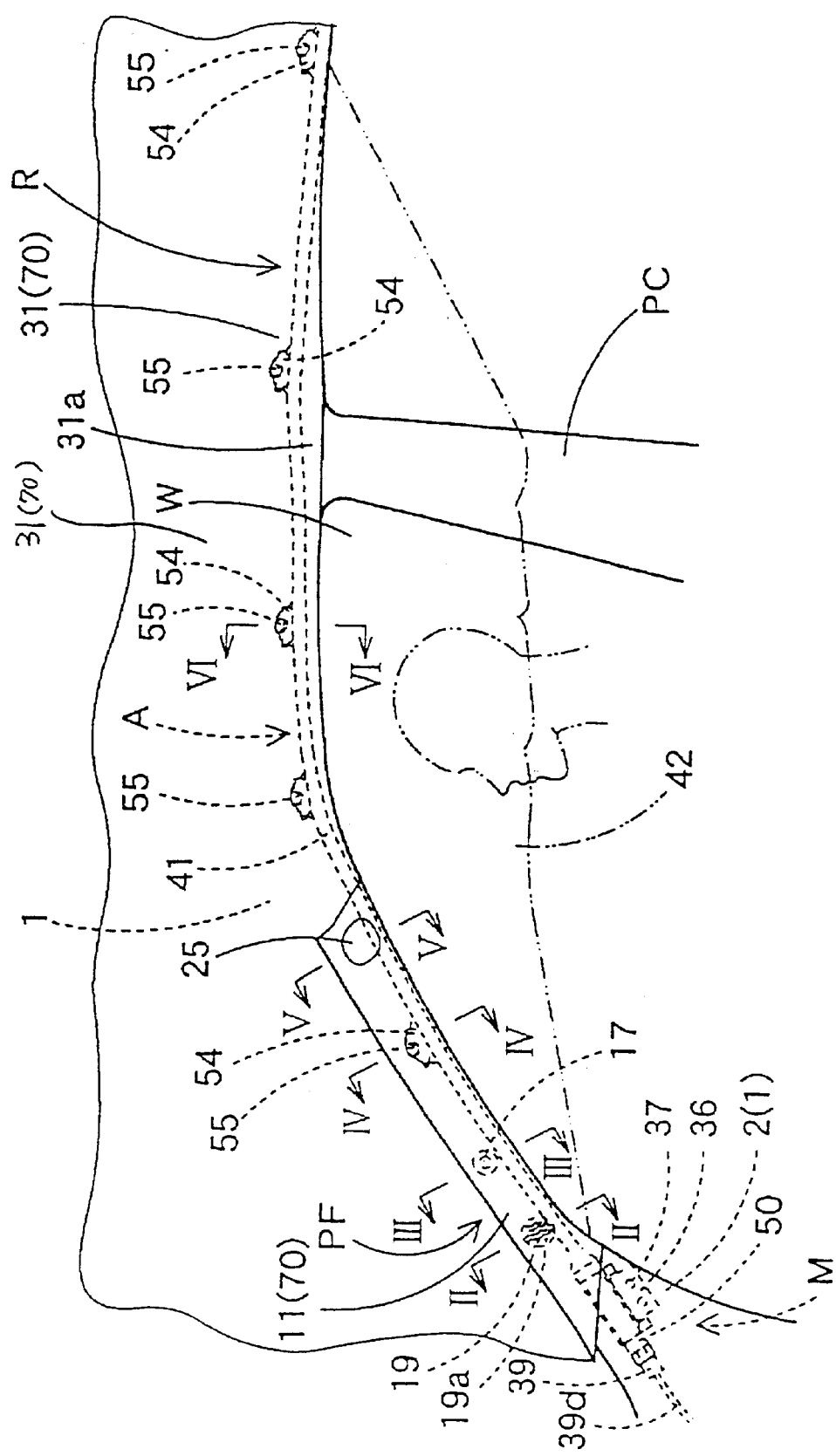
FIG. 1 is a front elevation showing a usage state of a side air bag device, in which an air bag according to one embodiment of the invention is used.

The invention will be described in connection with its embodiment with reference to the accompanying drawings. However, the invention should not be limited to the embodiments. All modifications in the requisites of claims and all equivalents to the same should be contained within the scope of the claims.

An air bag 41 of the embodiment shown in FIGS. 1 to 6 is used in a side air bag device M. This side air bag device M is arranged in the peripheral edge of an opening W of a door or a window on the interior side of an automobile. In the peripheral edge of the opening W, there are arranged a front pillar portion PF and a roof side rail portion R. As a result, the air bag device M is arranged on the interior side of the front pillar portion PF and the roof side rail portion R.

The side air bag device M is constructed to include the air bag 41, an inflator 39, a mounting bracket 36 and an air bag cover 70. The inflator 39 feeds an inflating gas to the folded air bag 41. The mounting bracket 36 joints the air bag 41 and the inflator 39. On the other hand, the bracket 36 mounts and fixes the inflator 39 onto a side panel 2 of a body 1. The air bag cover 70 covers the folded air bag 41. In this embodiment, the air bag cover 70 is constructed to include a garnish 11 and a roof interior member 31. The garnish 11 is arranged in the front pillar portion PF. The roof interior member 31 is arranged in the roof side rail portion R.

Figure 2:
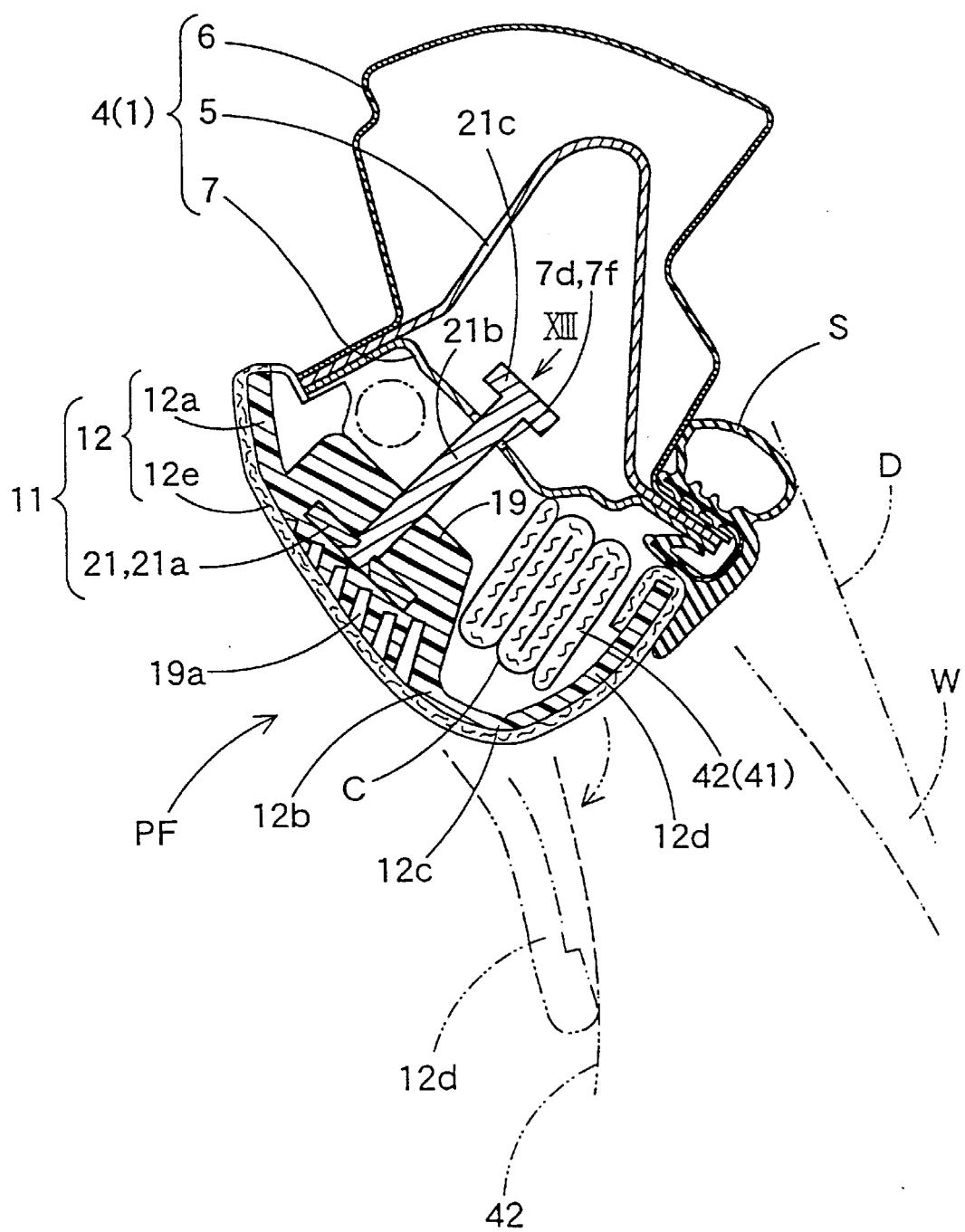
FIG. 2 is an enlarged schematic section of a portion II—II of FIG. 1.
Figure 6:
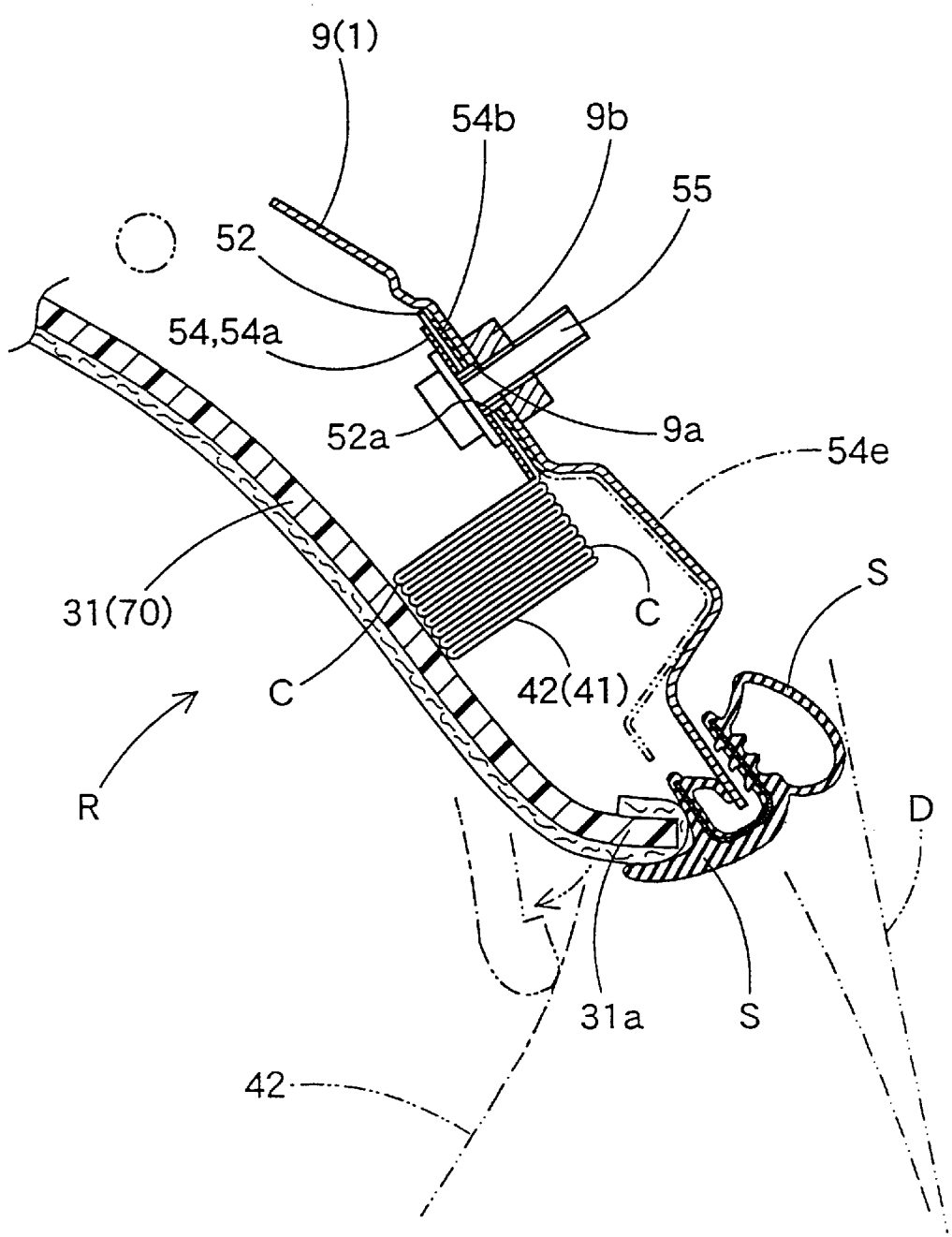
FIG. 6 is an enlarged schematic section of a portion VI—VI of FIG. 1.
Figure 7:
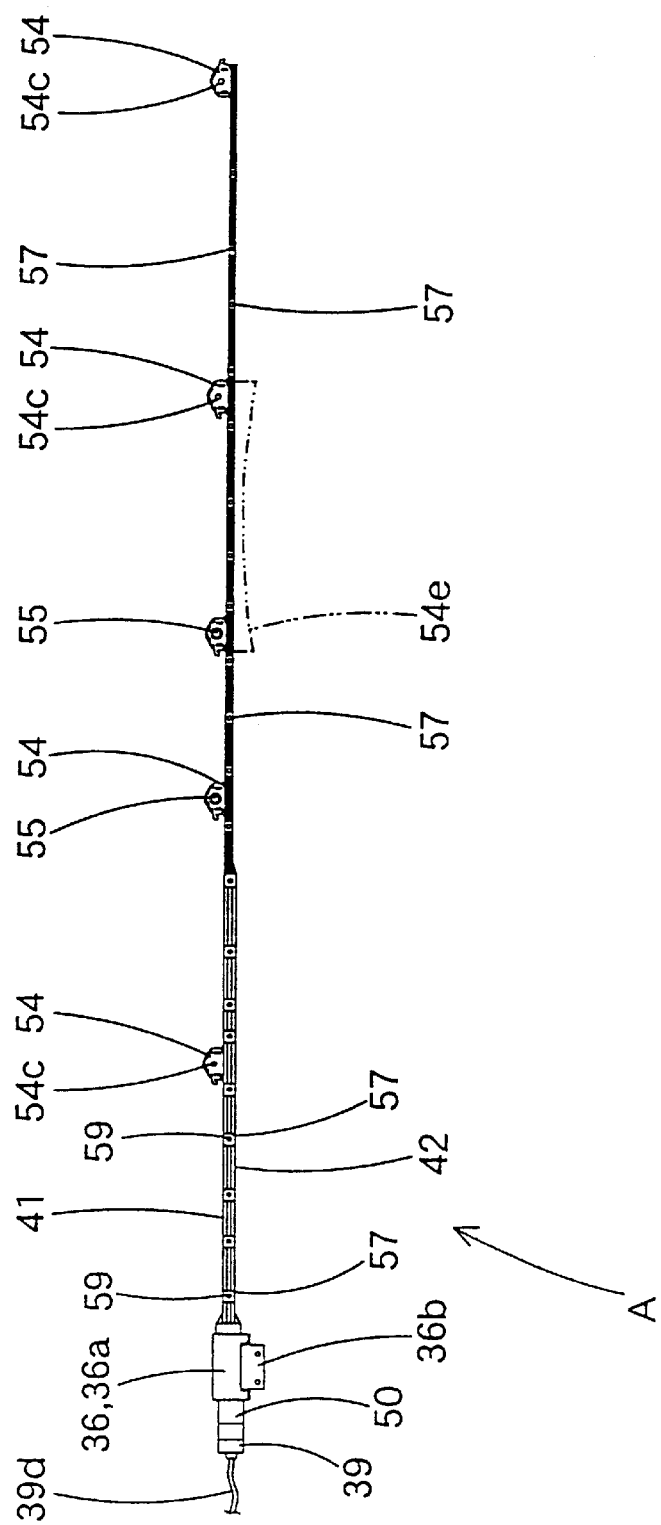
FIG. 7 is a front elevation showing an air bag assembly to be used in the embodiment.

Further, the side air bag device M of the embodiment is mounted to a front pillar body 4 or a roof side rail body 9 of the body 1 (as shown in FIG. 2 or 6). Also, the air bag device M is mounted as an air bag assembly A to the body 1, as shown in FIG. 7.

Here will be described the front pillar portion PF. This front pillar portion PF is constructed, as shown in FIGS. 2 to 5, to include the folded air bag 41, the pillar body 4, and the garnish 11. The pillar body 4 is a member belonging to the body 1. The pillar body 4 is constructed to include a lean force panel 5, an inner panel 7 and an outer panel 6. These panels 5, 7 and 6 are made of steel sheet. The garnish 11 is assembled with the inner panel 7.

Figure 3:
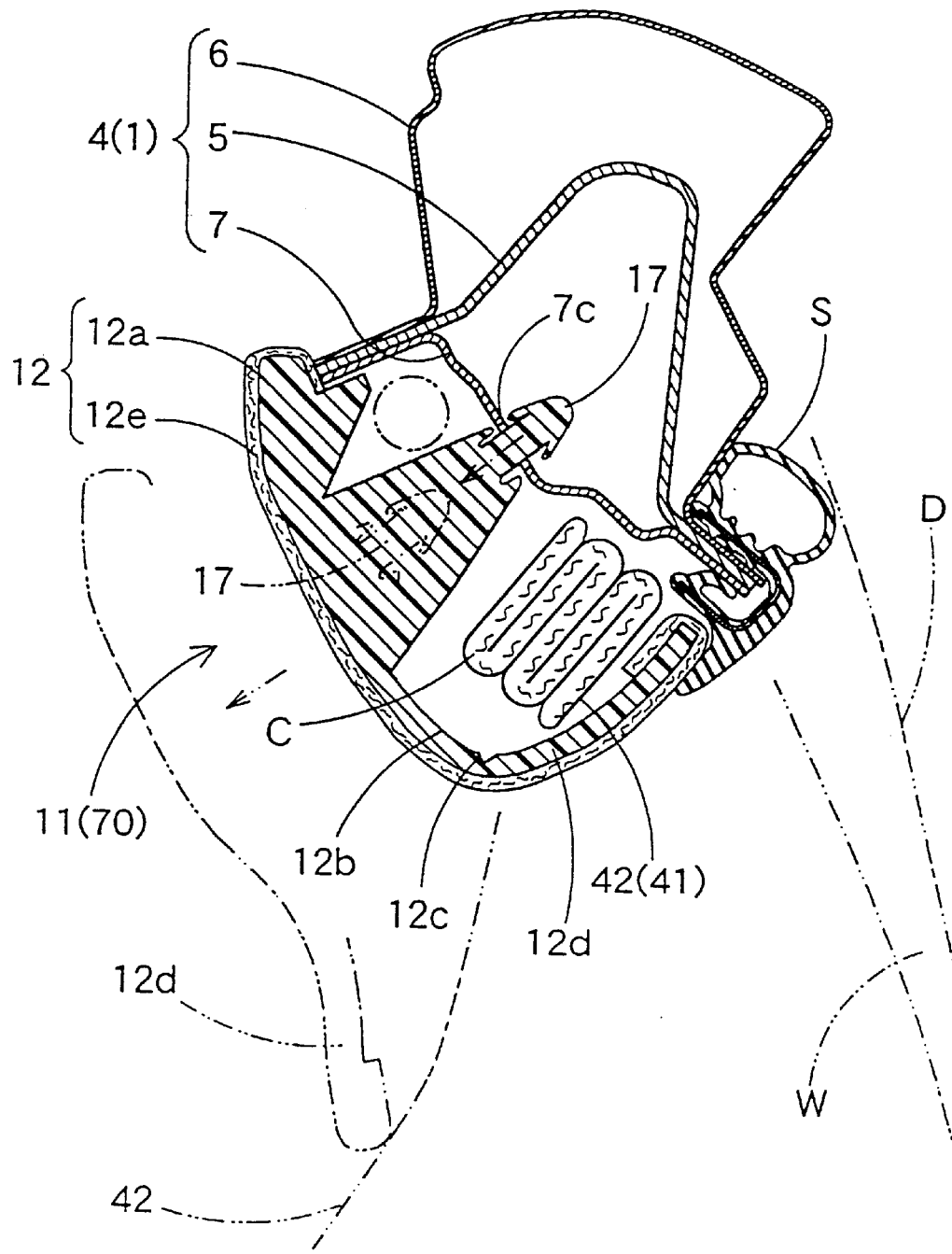
FIG. 3 is an enlarged schematic section of a portion III—III of FIG. 1.
Figure 4:
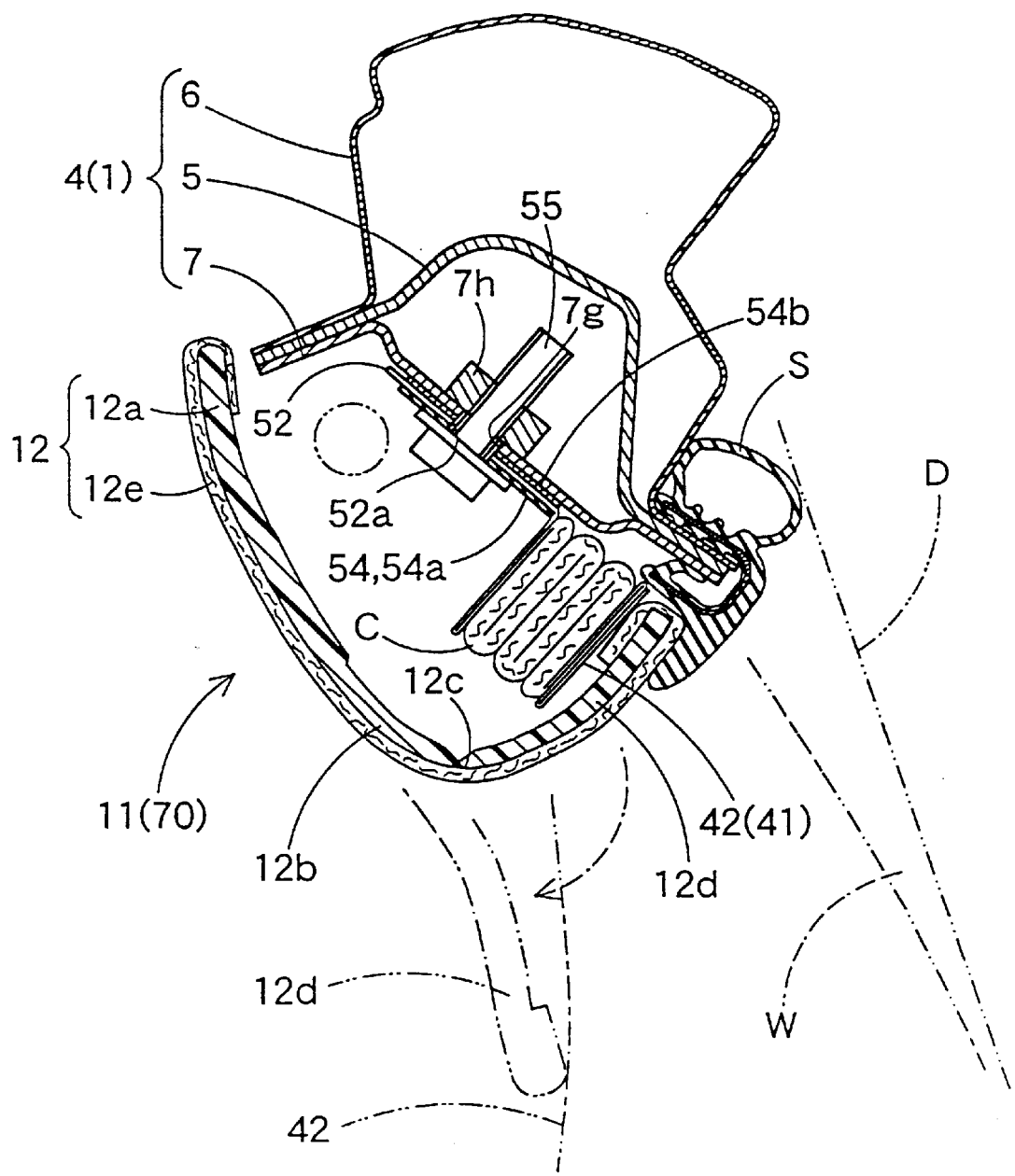
FIG. 4 is an enlarged schematic section of a portion IV—IV of FIG. 1.
Figure 5:
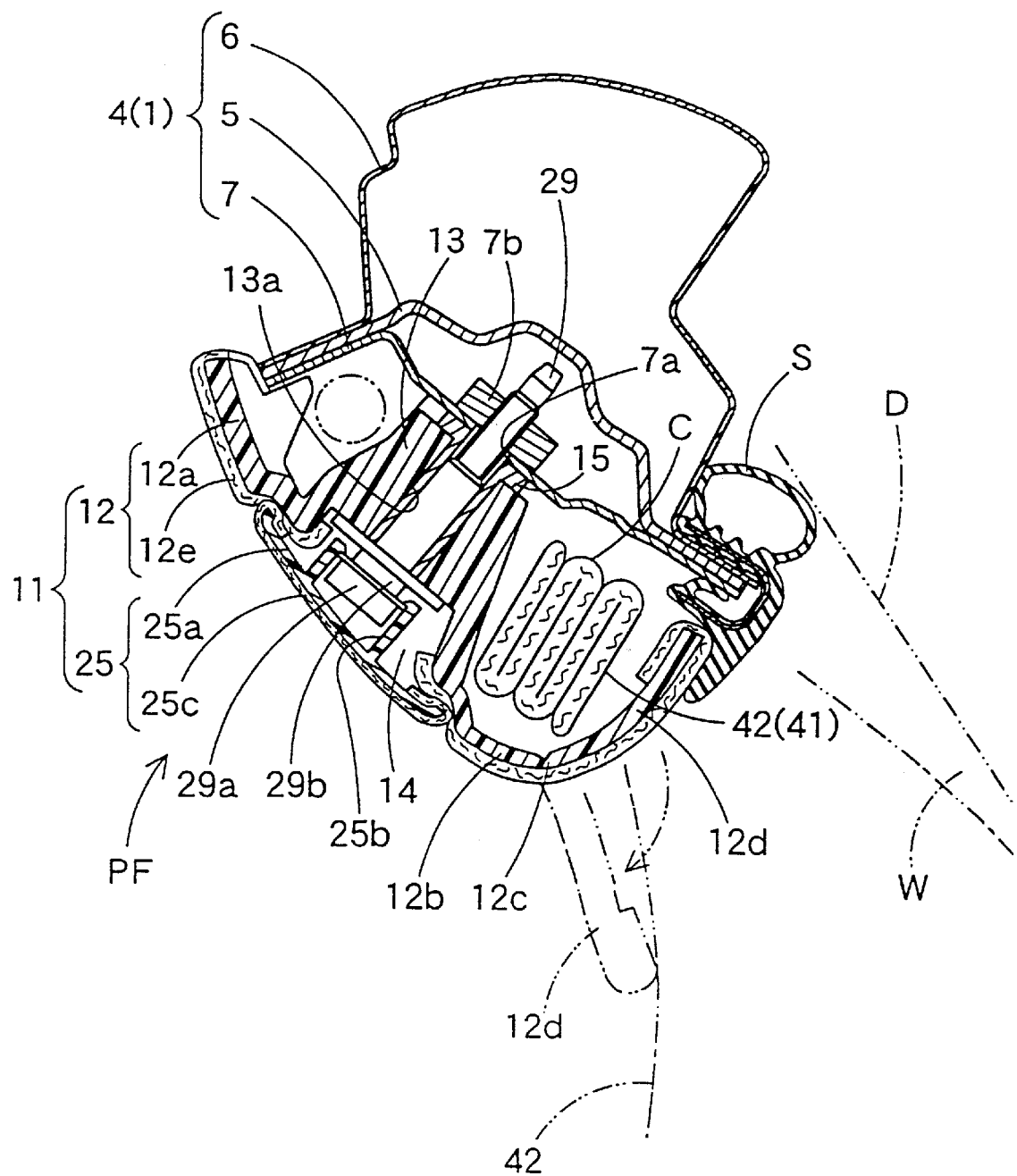
FIG. 5 is an enlarged schematic section of a portion V—V of FIG. 1.
Figure 13:
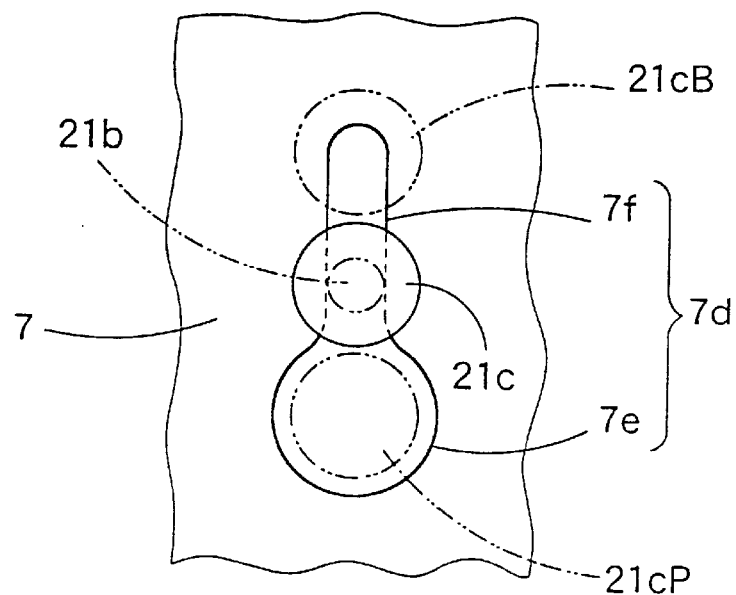
FIG. 13 is a diagram taken in a direction XIII of FIG. 2 and showing one retaining hole of an inner panel in a front pillar portion of the embodiment.

The inner panel 7 is provided, at predetermined positions, with a mounting hole 7a (as shown in FIG. 5), a retaining hole 7c (as shown in FIG. 3), a retaining hole 7d (as shown in FIGS. 2 and 13) and a mounting hole 7g (as shown in FIG. 4). At the portion of the mounting hole 7a, there is assembled the garnish 11. On the peripheral edge of the mounting hole 7a, there is fixed a nut 7b. Into this nut 7b, there is inserted a bolt 29 for mounting the garnish 11. On the peripheral edge of the retaining hole 7c, there is retained a retaining leg 17 of the garnish 11. The retaining hole 7d is opened to follow the contour of the front pillar portion PF. On the peripheral edge of the retaining hole 7d, there is retained a retaining pin 21 made of a metal. This retaining pin 21 is inserted when the garnish 11 is molded. At the mounting hole 7g, there is mounted the folded air bag 41. On the peripheral edge of the mounting hole 7g on the back side (or the vehicle exterior side) of the inner panel 7, there is fixed a nut 7h. On the end portion of the pillar body 4, moreover, there is mounted a weather strip S. Here, a member designated by letter D in FIGS. 2 to 6 is a door.

The garnish 11 is constructed to include a garnish body 12, the retaining pin 21 and a cap 25. The garnish body 12 is made of a synthetic resin such as a thermoplastic olefin elastomer. The cap 25 is fitted into the garnish body 12.

The garnish body 12 is comprised of a long-length molding 12a and a facing 12e. The molding 12a is formed using an injection-molding method. The facing 12e is made of fabric or the like. This facing 12e is adhered to the decorative face of the garnish body 12. On the other hand, the molding 12a is comprised of a general portion 12b and a door portion 12d. The door portion 12d is arranged on the edge on the side of the opening W. Between the door portion 12d and the general portion 12b, there is arranged a thin hinged portion 12c. The door portion 12d is turned to open on the hinged portion 12c by the push of the air bag 41 when this air bag 41 is developed to expand. Here, at the general portion 12b, there are arranged a mounting boss portion 13, the retaining leg 17 and a buried portion 19, as will be described hereinafter.

Over the garnish body 12, as shown in FIG. 5, there is formed the mounting boss portion 13. This mounting boss portion 13 is provided with a mounting hole 13a for inserting the mounting bolt 29 therethrough. In the inner circumference of the mounting hole 13a, there is fitted a sleeve 15 made of a metal. This sleeve 15 is provided for ensuring the fastening force of the mounting bolt 29. This bolt 29 is provided for mounting the garnish 11 on the inner panel 7. On the other hand, the garnish body 12 is provided with an accommodating recess 14 around the mounting boss portion 13 on the front side (or the vehicle interior side). In the accommodating recess 14, there is fitted the cap 25. This cap 25 is provided for covering the mounting bolt 29. The cap 25 is comprised of a molding 25a and a facing 25c. The molding 25a is made of a synthetic resin such as polyamide using an injection-molding method. The facing 25c is adhered to the molding 25a. This facing 25c is made of the same material as that of the facing 12e. The molding 25a is provided with a plural of retaining claws 25b. These retaining claws 25b are retained on the peripheral edge of a retaining groove 29b which is formed in a head 29a of the mounting bolt 29. Here, the cap 25 is provided with a not-shown stopper member. This stopper member is retained on the peripheral edge of a not-shown through hole formed at the position of the accommodating recess 14. This stopper member prevents the cap 25 from being separated from the garnish body 12 even when it is separated from the bolt 29.

In the lower portion of the back side (or the vehicle exterior side) of the garnish body 12, as shown in FIG. 2, there is formed the burying portion 19. In this burying portion 19, there is buried the retaining pin 21. This retaining pin 21 is provided with a buried portion 21a, a stem portion 21b and a retained portion 21c. The buried portion 21a is buried in a disc shape within the burying portion 19. The retaining portion 21c is formed into a disc shape. The retaining pin 21 is retained, as shown in FIGS. 2 and 13, at its retained portion 21c on the peripheral edge of a narrower portion 7f of the retaining hole 7d. The retaining hole 7d formed in the inner panel 7 is opened to have a wider portion 7e and a narrower portion 7f. The wider portion 7e is opened to insert the retained portion 21c from the front side (or the vehicle interior side). The opening of the narrower portion 7f is made so wide as to enable the insertion of the stem portion 21b, but not so as to pass the retained portion 21c. Here, the burying portion 19 is provided on the front side (or the vehicle interior side) with a number of lightening holes 19a. By these lightening holes 19a, no sink mark is formed in the front side portion of the garnish body 12 at the arranged position of the burying portion 19.

At a generally intermediate portion, as taken in the vertical direction, on the back side of the garnish body 12, as shown in FIG. 3, there is formed a retaining leg 17. This retaining leg 17 retains the peripheral edge of the retaining hole 7c of the inner panel 7.

Here, the garnish 11 is mounted on the pillar body 4 in the following manner. First, the retained portion 21c is inserted into the wider portion 7e (that is, the retained portion 21c is inserted to a position 21cP, as indicated by double dotted lines in FIG. 13). After this, the retained portion 21c is transferred toward the narrower portion 7f (that is, the retained portion 12c is transferred to the position of the solid lines in FIG. 13). On the other hand, the retaining leg 17 is retained on the peripheral edge of the retaining hole 7c. Moreover, the mounting bolt 29 is screwed through the mounting hole 13a of the mounting boss portion 13 (or through the sleeve 15) on the nut 7b at the mounting hole 7a. Then, the cap 25 is fitted in the accommodating recess 14. As a result, the work of mounting the garnish 11 on the pillar body 14 is completed.

On the other hand, the garnish 11 is pushed by the air bag 41 when this air bag 41 is developed to expand. Moreover, the retaining leg 17 leaves the peripheral edge of the retaining hole 7c. On the other hand, the retained portion 21c of the retaining pin 21 slides to a position 21cB, as indicated by the double dotted lines in FIG. 13. Moreover, the generally vertically intermediate portion of the garnish 11 moves out of the inner panel 7 into the interior. Then, the door 12d portion is opened. As a result, the air bag 41 protrudes greatly from the position of the garnish 11.

Here will be described the roof side rail portion R. The roof side rail portion R is constructed, as shown in FIG. 6, to include the folded air bag 41, the roof side rail body 9 and the roof interior member 31. The roof side rail body 9 is a member belonging to the body 1 and is made of a steel sheet. The roof interior member 31 is assembled at a not-shown predetermined position with the body 1.

The roof side rail body 9 is provided at its predetermined position with the mounting hole 9a. At the position of the mounting hole 9a, there is mounted the folded air bag 41. The nut 9b is fixed on the peripheral edge of the mounting hole 9a on the back side (or the vehicle exterior side) of the roof side rail body 9. Further, the weather strip S is mounted on the end portion of the roof side rail body 9.

The roof interior member 31 is made of a flexible synthetic resin material. Therefore, an edge 31a of the roof interior member 31 on the side of the opening W is pushed by the air bag 41 to easily separate from the roof side rail body 9 when the air bag 41 is developed to expand.

Moreover, the air bag assembly A in the side air bag device M of the embodiment is constructed, as shown in FIG. 7, to include the air bag 41, the inflator 39, the mounting brackets 36 and 54 and a tape member 57. The mounting bracket 36 joints the air bag 41 and the inflator 39. The mounting bracket 54 is assembled with the air bag 41. The mounting bracket 54 mounts the air bag 41 in the body 1. The tape member 57 envelops a folded air bag body 42. Here, the tape member 57 is indicated on its vehicle interior side face by marks 59 for torsion discriminations. These marks 59 prevent the air bag body 42 from being torsionally mounted in the body 1.

Figure 8:
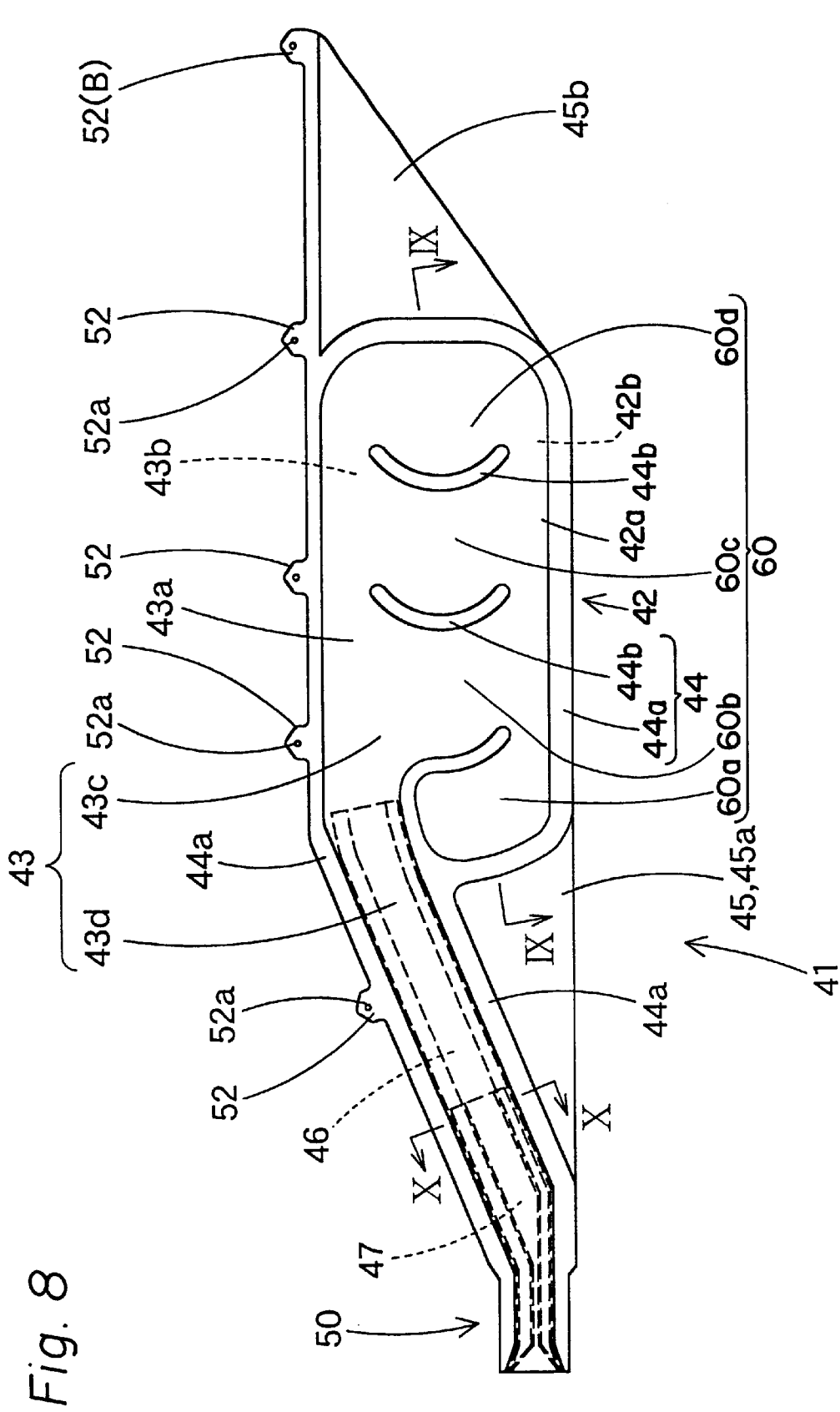
FIG. 8 is a front elevation showing a developed state of the air bag of the embodiment.
Figure 9:
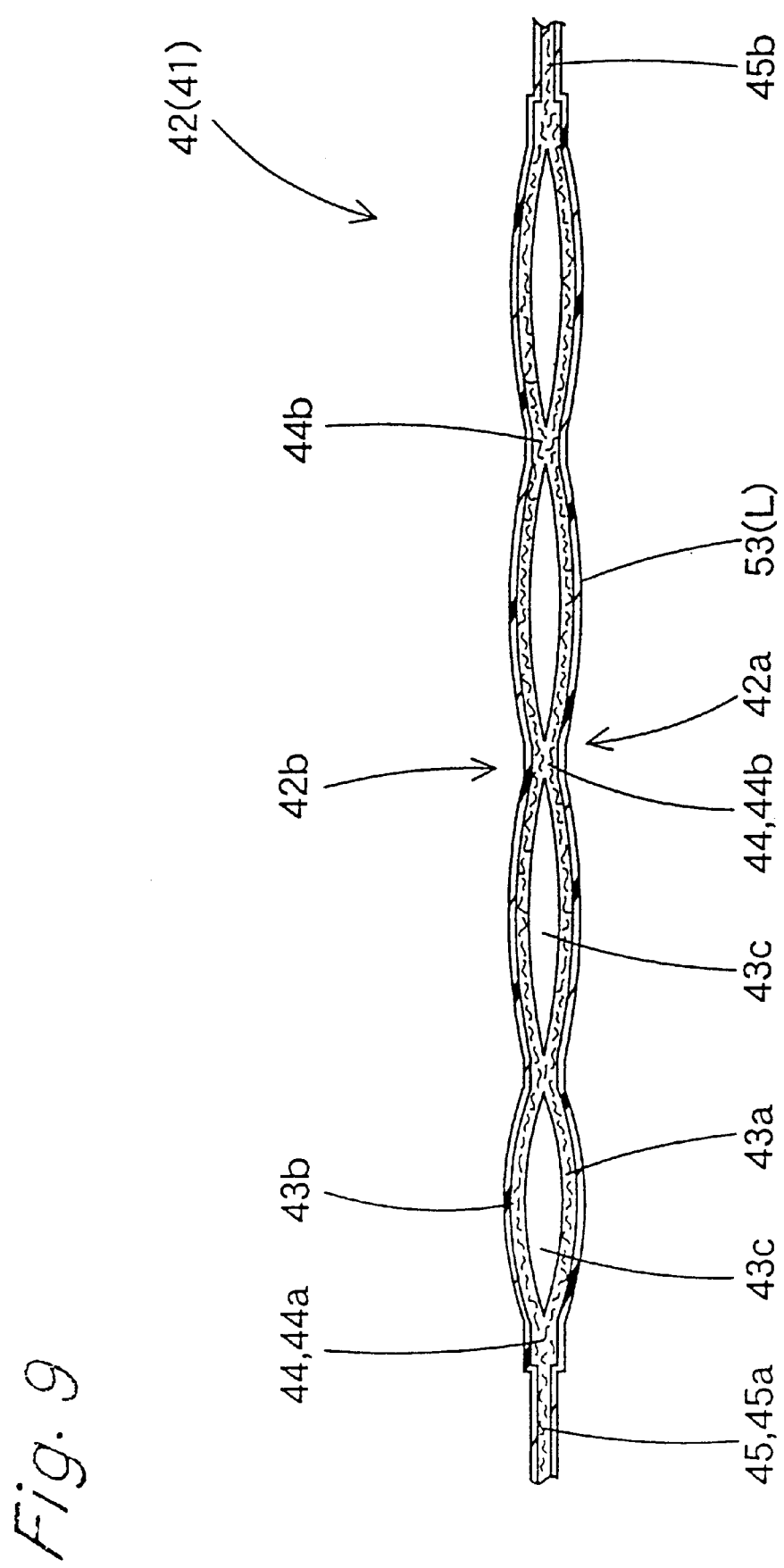
FIG. 9 is an enlarged section of a portion IX—IX of FIG. 8.
Figure 10:
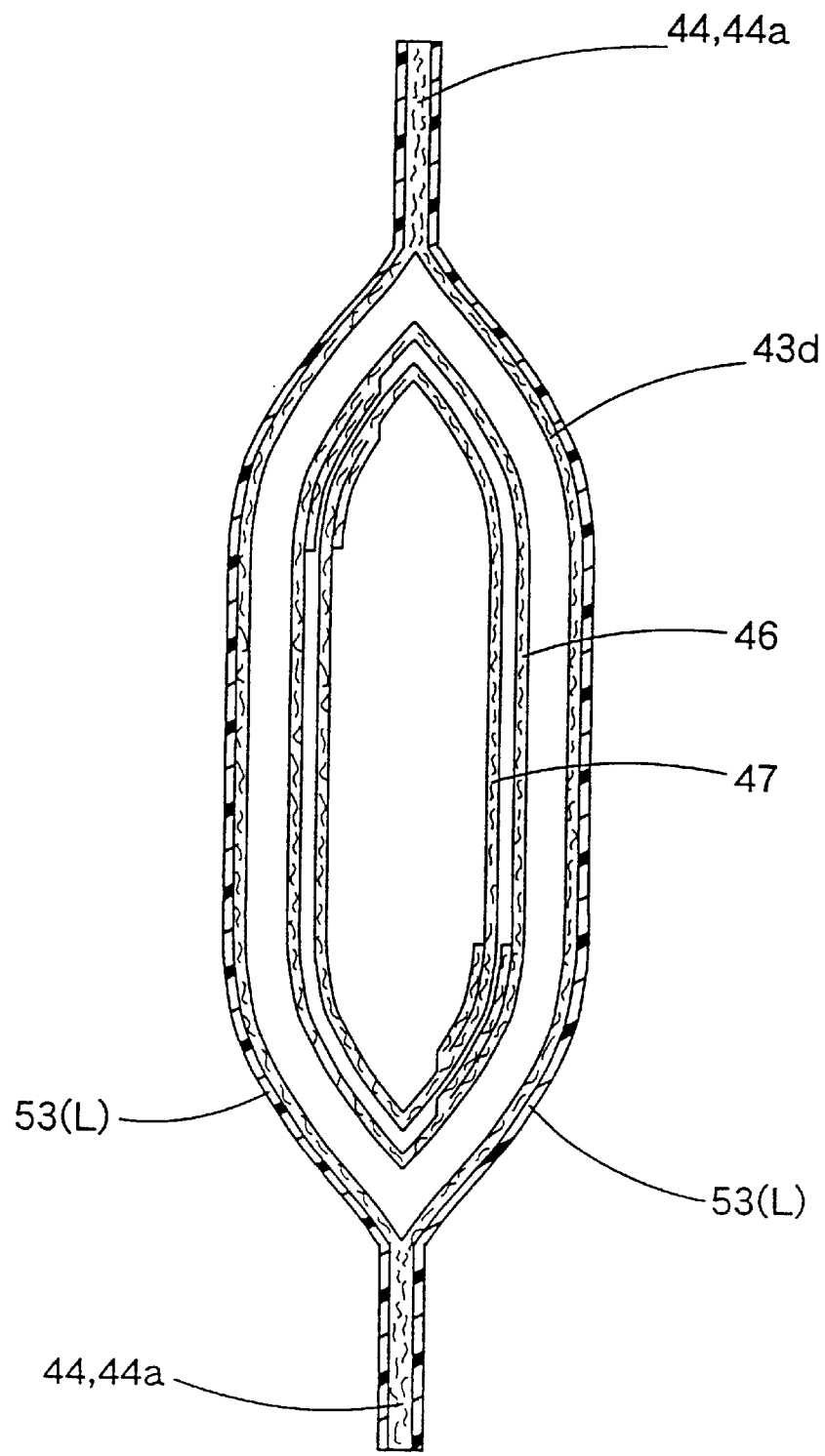
FIG. 10 is an enlarged section of a portion X—X of FIG. 8.

The air bag 41 is constructed, as shown in FIGS. 8 to 10, to include the air bag body 42, a joint cylinder 50 and a mounting member 52. The air bag body 42 is developed from its folded state and expanded to a larger thickness as the inflating gas from the inflator 39 flows in. The joint cylinder 50 is jointed to the inflator 39. Mounting members 52 are provided in plurality on the upper edge side of the air bag body 42.

In the case of the present embodiment, the air bag 41 is formed by hollow weaving of polyamide yarns or the like. Moreover, the air bag 41 is provided with a coating layer 53. This coating layer 53 is formed, after the hollow weaving, by applying a coating agent L such as silicone rubber. The coating layer 53 is provided for enhancing the heat resistance of the air bag 41 and for preventing the leakage of the inflating gas. Here, the coating agent L cannot be applied to the inner circumference side of the air bag 41 after this air bag 41 is woven. This reason will be described below. The air bag 41 is provided with later-described central binding portions 44b, by which the air bag 41 cannot be turned upside down. Therefore, the coating layer 53 is formed after the weaving operation on the outer circumference side of the air bag 41.

In the case of the embodiment, 51.2 warps and wefts per inch are individually woven in the hollow-woven air bag 41. The warps and wefts are made of polyamide of 420 deniers.

In the air bag 41 of the embodiment, moreover, the internal pressure is set to have a level of 44 kPa at 500 msecs after the start of inflow of the inflating gas from the inflator 39. The air bag 41 is further set to have an internal pressure of 20 kPa at 3 secs after the start of inflow of the inflating gas. This setting is made by adjusting the thickness of the coating layer 53. In the air bag 41 of the embodiment, more specifically, the coating agent L of silicone rubber is applied in an amount of 160 g/m$^2$.

The air bag body 42 is constructed to include a bag portion 43, a binding portion 44 and a plane portion 45. The bag portion 43 is provided with a vehicle interior side wall portion 43a and a vehicle exterior side wall portion 43b. The binding portion 44 is arranged around the bag portion 43 and in the vicinity of the center. This binding portion 44 is so densely woven as to seal up the bag portion 43. The plane portion 45 is arranged around the binding portion 44. This plane portion 45 is woven into a thin plane.

The bag portion 43 is comprised of an expanding portion 43c and a gas inlet portion 43d. This expanding portion 43c is expanded to increase its thickness when fed with the inflating gas. The gas inlet portion 43d is a portion through which the inflating gas is let into the expanding portion 43c.

The binding portion 44 is comprised of a peripheral edge binding portion 44a and the central binding portions 44b. The peripheral edge binding portion 44a is arranged around the bag portion 43. This peripheral edge binding portion 44a is so densely woven as to seal up the bag portion 43. The central binding portions 44b are arranged in the vicinity of the center of the expanding portion 43c of the bag portion 43. These central binding portions 44b and 44b are so densely woven as to bind the interior side wall portion 43a and the exterior side wall portion 43b. The central binding portions 44b and 44b exhibit tension from the joint cylinder 50 to the rear upper portion of the air bag body 42 when the bag portion 43 expands. By such tension, the expanding portion 43c as inflated does not move to the vehicle exterior side even if it is pushed.

The central binding portions 44b define a plurality of cells 60 positioned across the expanding portion 43c arranged from a frontward to reward direction, as shown in FIG. 8. For example, the plurality of cells can comprise a first cell 60a located nearest the inflator 39 and adjacent to the front plane portion 44a. Other cells, for example 60a–60d, are spaced rearward from the first cell 60a. The plurality of cells 60a–60d are defined by the binding portion 44 which allows the inflating gas to flow over the tops of the central binding portions 44b and then through the expanding portion 43c.

The plane portion 45 is provided for retaining the entire shape of the air bag 41 from the joint cylinder 50 to the rear upper portion of the air bag body 42. The plane portion 45 is also provided for reducing the volume of the bag portion 43. As the volume of the bag portion 43 is made smaller, the time period for completing the expansion of the bag portion can be made shorter. The plane portion 45 is comprised of a front plane portion 45a and a rear plane portion 45b. The front plane portion 45a joints the gas inlet portion 43d and the expanding portion 43c. The rear plane portion 45b joints the expanding portion 43c and a rear side mounting member 52(B).

Figure 11:
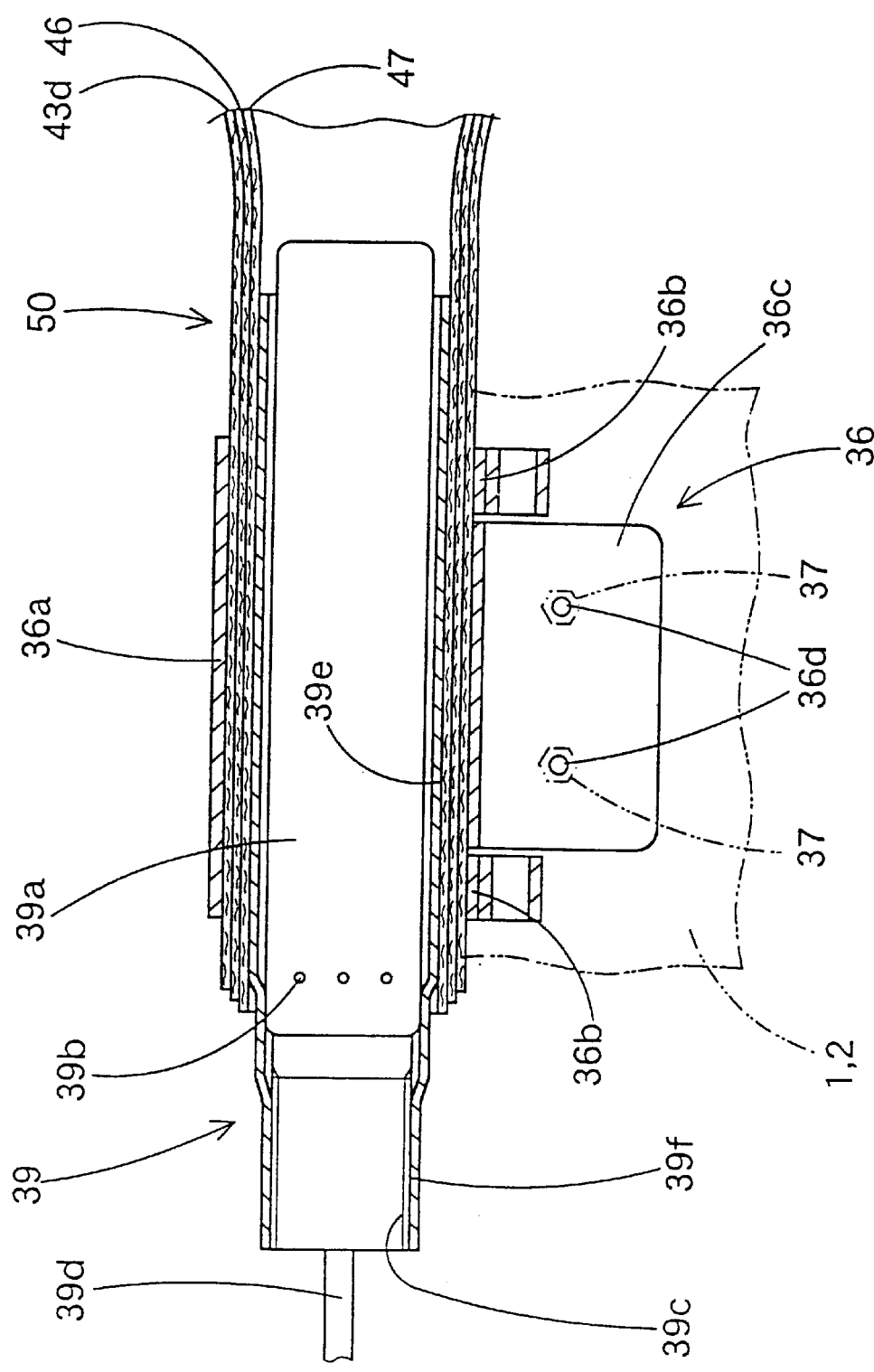
FIG. 11 is a longitudinal section of a jointed portion between the air bag of the embodiment and an inflator.

The joint cylinder 50 is arranged at the leading end of the gas inlet portion 43d (as shown in FIG. 11). The joint cylinder 50 sheathes the inflator 39 therein. Moreover, the joint cylinder 50 is jointed to the inflator 39 by fastening it on the mounting bracket 36.

In the joint cylinder 50, moreover, there are arranged on the inner circumference side of the gas inlet portion 43d longer and shorter cylindrical inner tubes 46 and 47. These tubes 46 and 47 are provided for retaining the heat resistance of the joint cylinder 50 to the hot inflating gas to come from the inflator 39. The inner tubes 46 and 47 are also individually hollow-woven of polyamide yarns or the like. Here, these inner tubes 46 and 47 are also provided with (not-indicated) coating layers for enhancing their heat resistances. These coating layers are formed after the weaving operations by applying silicone rubber or the like. Moreover, the tubes 46 and 47 are turned inside-out so in that their coating layers may be arranged on the inner circumference side. Still moreover, the tubes 46 and 47 are sequentially inserted into the gas inlet portion 43d with their coating layers being arranged on the inner circumference side. The inner tube 46 is arranged on the inner circumference side of the gas inlet portion 43d in the bag portion 43 of the air bag body 42. This tube 46 extends to the expanding portion 43c. The inner tube 47 is arranged on the inner circumference side of the inner tube 46. The tube 47 extends to the vicinity of the intermediate portion of the gas inlet portion 43d.

Each mounting member 52 is provided, as shown in FIGS. 4 and 6 to 8, with a mounting hole 52a, and fixes the mounting bracket 54. Each mounting member 52 is mounted on the pillar body 4 of the body 1 or the roof side rail body 9 by means of a mounting bolt 55. This bolt 55 is inserted through the mounting hole 52a.

Each mounting bracket 54 is comprised of inner and outer plates 54a and 54b made of a metal sheet. These inner and outer plates 54a and 54b are arranged at the vehicle interior side portion and the vehicle exterior side portion of each mounting member 52. The inner and outer plates 54a and 54b are provided with mounting holes 54c leading to the mounting holes 52a. When the inner and outer plates 54a and 54b are to be mounted, they are arranged at first so as to clamp each mounting member 52. Next, the plates 54a and 54b are partially caulked to form bent portions so that they are mounted on each mounting member 52. Here, the two mounting brackets 54 to be arranged in the vicinity of a center pillar portion PC on the side of the roof side rail portion R are provided with an extension 54e, as indicated by double-dotted lines in FIGS. 6 and 7. This extension 54e is made to extend downwards by jointing the two brackets 54 and 54 to each other. The extension 54e is a guide portion for guiding the air bag body 42 toward the vehicle interior when the air bag body 42 is expanded. The reason why the extension 54e is provided is to prevent the expanding air bag body 42 from entering the clearance between the interior member of the center pillar portion PC and the pillar body.

The inflator 39 is constructed as a cylinder type, as shown in FIG. 11. This inflator 39 is constructed to include an inflator body 39a and a diffuser 39e. The inflator body 39a is provided with a gas discharge port 39b for discharging the inflating gas. The diffuser 39e is made of a generally cylindrical metal sheet and is fixed on the inflator body 39a. This diffuser 39e guides the inflating gas in the axial direction. With the inflator body 39a, there are connected lead wires 39d. These lead wires 39d feed the inflator body 39 with a signal for discharging the inflating gas. On the end portion of the inflator body 39a, moreover, there is formed an externally threaded portion 39c. In the diffuser 39e, there is formed a corresponding internally threaded portion 39f. By bringing the threaded portions 39c and 39f into a meshed engagement with each other, the diffuser 39e is fixed on the inflator body 39a.

Figure 12:
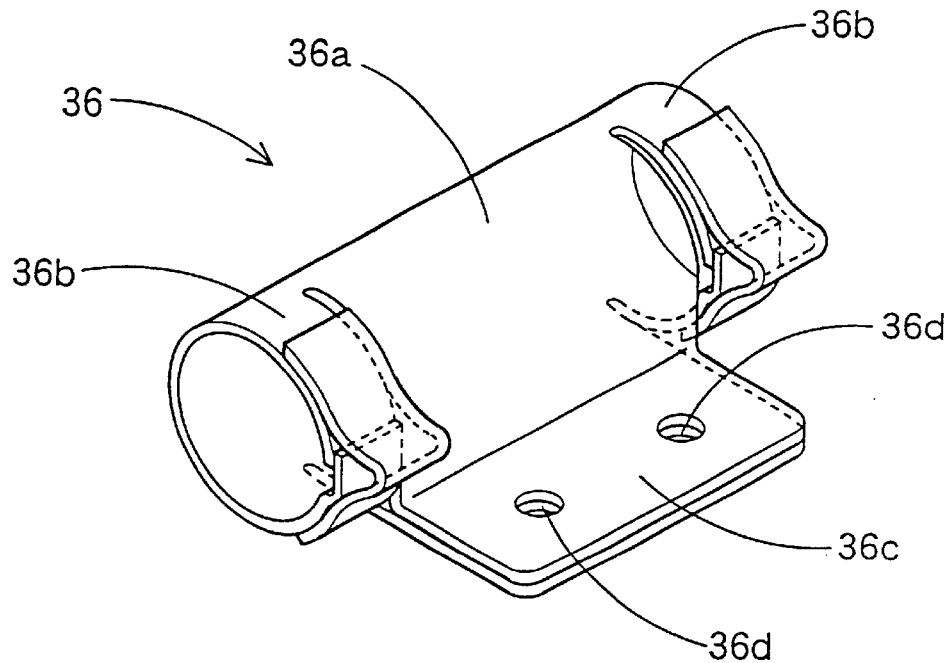
FIG. 12 is a perspective view of a mounting bracket to be used for jointing the air bag of the embodiment and the inflator.

The mounting bracket 36 is made of a metal sheet, as shown in FIGS. 11 and 12. This mounting bracket 36 is comprised of cylindrical portions 36a and 36a and a bracket body 36c. The cylindrical portions 36a are arranged around the joint cylinder 50 of the air bag 41. This joint cylinder 50 sheathes the inflator 39 therein. The bracket body 36c is formed to extend from the cylindrical portions 36a. The bracket body 36c is mounted on the side panel 2 of the body 1 by means of mounting bolts 37 (as shown in FIG. 1). At the two ends of the cylindrical portion 36a, there are formed cylindrical caulked portions 36b. These caulked portions 36b and 36b can be caulked and elastically deformed to reduce their internal diameter. The bracket body 36c is provided with two mounting holes 36d. Into these mounting holes 36d and 36d, there are inserted the mounting bolts 37.

The tape member 57 is made of an adhesive tape. This adhesive tape is prepared by applying an adhesive to cloth or paper. Moreover, the tape member 57 is wound on the folded air bag body 42. At this tape member 57, moreover, there are indicated by means of a pen or the like on the vehicle interior side face the marks 59. These marks 59 are formed by painting the tape member 57 a color different from that of the air bag body 42 or the tape member 57.

Here will be described a manufacture of the air bag assembly A. The air bag 41 is manufactured in advance. For manufacturing this air bag 41, the inner tubes 46 and 47 are inserted into the gas inlet portion 43d of the air bag body 42. Then, the gas inlet portion 43d and the inner tubes 46 and 47 are fixed to each other using the ultrasonic welding method or the like so that the air bag 41 can be manufactured.

Figure 14:
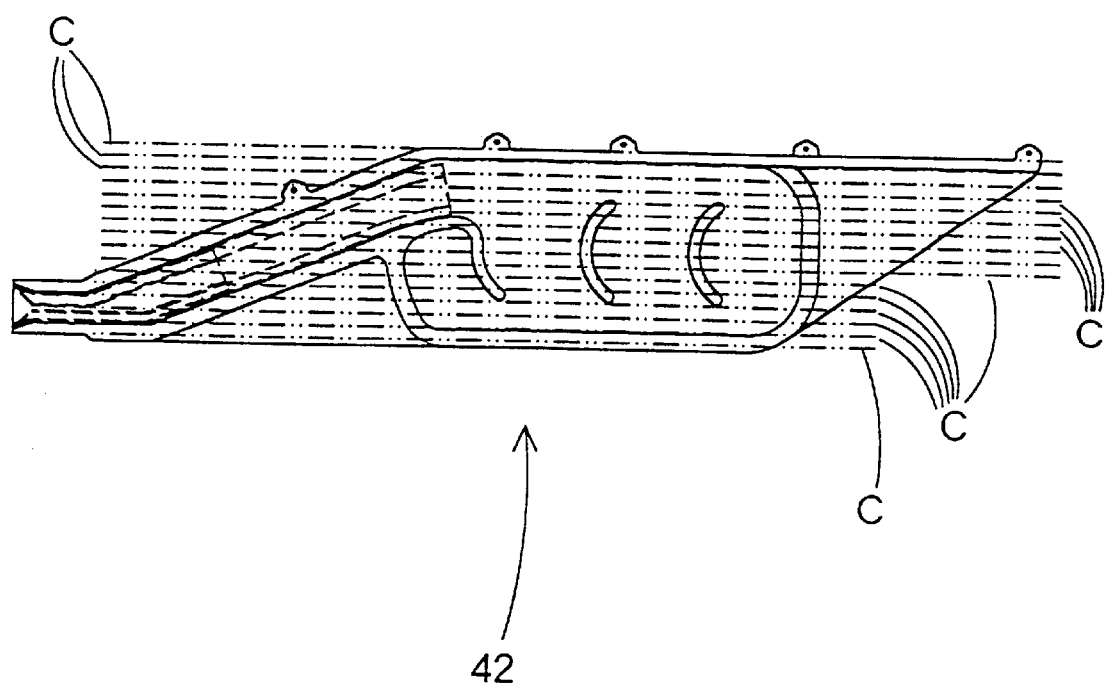
FIG. 14 is a diagram showing folds when the air bag body of the embodiment is folded.

After this, the air bag body 42 is folded by a predetermined folding machine. Here, this folding is performed such that it results in a bellows shape. In this bellows folding method, folds C are made sequentially in crests and valleys at positions indicated by double-dotted lines in FIG. 14. Next, the folded air bag 41 is suitably wrapped with the tape member 57. Moreover, the marks 59 are indicated on the vehicle interior side face of the tape member 57.

After this, the inner and outer plates 54a and 54b are arranged on the two sides of the individual mounting portions 52 while aligning the mounting holes 52a and 54c. Next, the predetermined mounting brackets 54 are mounted on the individual mounting members 52 by caulking their predetermined positions. Here, the mounting members 52 thus folded are pulled out. Then, the mounting brackets 54 are mounted on the mounting members 52.

Further, the folded joint cylinder 50 is unfolded. Then, the inflator 39 is inserted into the inner tube 47 of the joint cylinder 50.

Next, the joint cylinder 50 of the air bag 41 is sheathed in the cylindrical portion 36a of the mounting bracket 36. Then, the caulked portions 36b and 36b are caulked and diametrically reduced. As a result, the inflator 39 and the joint cylinder 50 are jointed. To this jointed portion, moreover there is mounted the mounting bracket 36.

Moreover, the mounting bolt 55 is tentatively assembled with a predetermined mounting bracket 54. As a result, the air bag assembly A can be made.

Here will be described the work of mounting the air bag assembly A in the body 1. First, as shown in FIGS. 1, 4 and 6, the bracket body 36c of the mounting bracket 36 is arranged at a predetermined position of the side panel 2. Next, the individual mounting bolts 37 are fastened through the mounting holes 36d to the side panel 2. Moreover, the individual mounting brackets 54 are arranged on the inner panel 7 of the pillar body 4 of the pillar portion PF such that the mounting holes 54c, 52a and 7g may be aligned with one another. On the other hand, the individual mounting brackets 54 are arranged on the roof side rail body 9 of the roof side rail portion R such that the mounting holes 54c, 52a and 9a may be aligned with one another. If the mounting bolts 55 are screwed into the nuts 7h and 9b through the mounting holes 52a and 54c, moreover, the air bag assembly A can be mounted in the body 1.

After the air bag assembly A is mounted in the body 1, moreover, the lead wires 39d are connected with a predetermined air bag actuating circuit. In the pillar portion PF, as shown in FIGS. 1 to 6, still moreover, the garnish 11 is mounted and fixed on the inner panel 7. In the roof side rail portion R, on the other hand, the roof interior member 31 is mounted in the body 1. As a result, the air bag 41 is covered with the inner panel 7 and the roof interior member 31.

After this, if the inflator 39 is activated, the bag portion 43 of the air bag body 42 of the air bag 41 is fed with the inflating gas. Then, the gas inlet portion 43d and the expanding portion 43c of the bag portion 43 are expanded to burst the tape member 57. On the other hand, the garnish 11 of the pillar portion PF is pushed onto the air bag body 42. As indicated by the double-dotted line in FIG. 3, moreover, the retaining leg 17 unfastens from the retaining hole 7c. On the other hand, the retained portion 21c of the retaining pin 21 slides along the front pillar portion PF to the position 21cB indicated by the double-dotted lines in FIG. 13. Moreover, the generally vertical intermediate portion of the garnish 11 moves inward within the interior away from the inner panel 7. Still moreover, the door portion 12d is opened. Still moreover, the roof interior member 31 of the roof side rail portion R is pushed onto the air bag body 42. As indicated by the double-dotted lines in FIG. 6, moreover, the edge 31a of the roof interior member 31 is opened. As a result, as indicated by the double-dotted lines in FIG. 1, the air bag body 42 is largely developed and expanded so as to cover the opening W.

Figure 15:
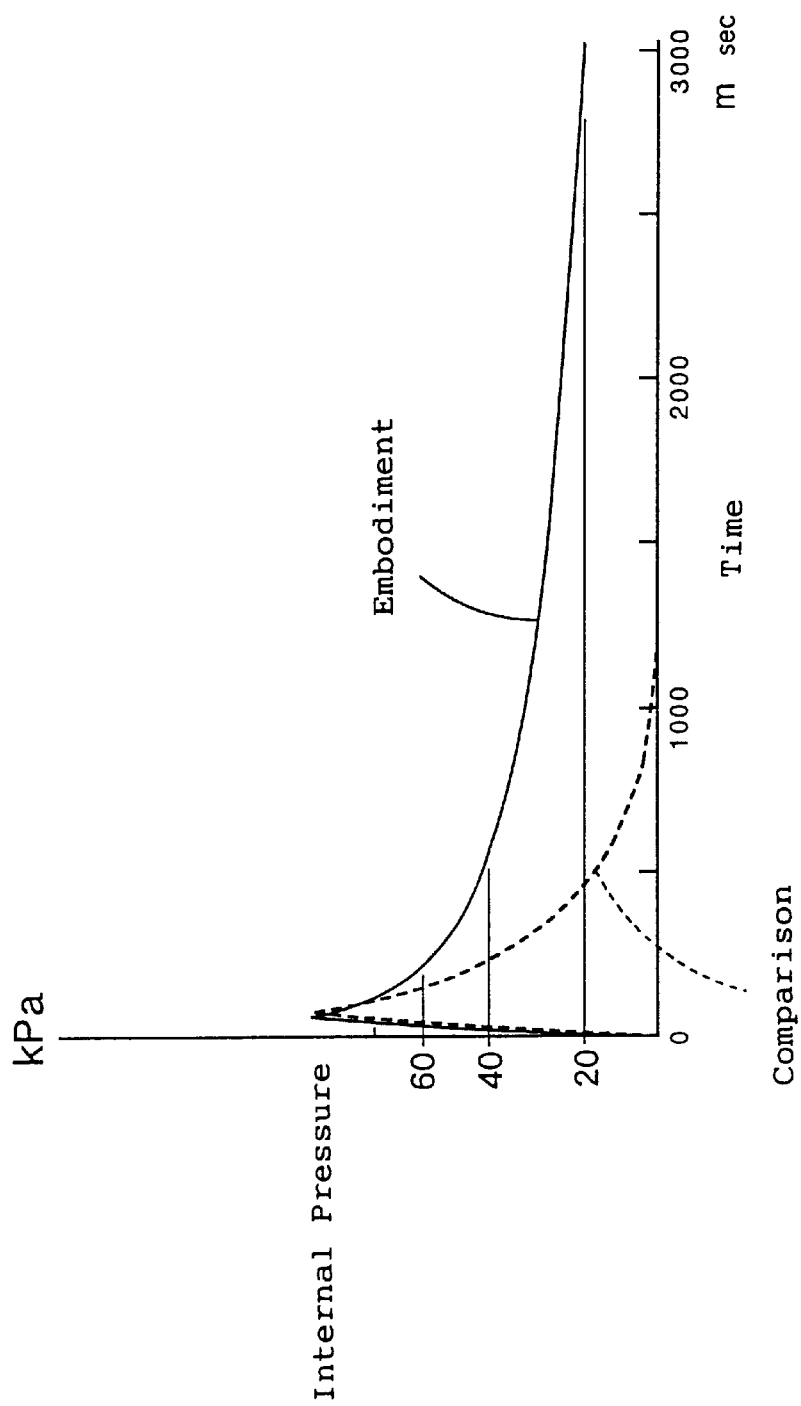
FIG. 15 is a graph illustrating internal pressures of the embodiment and a comparison at expansion times.

At the development and expansion time of this air bag body 42, in the air bag 41 of the embodiment, the internal pressure at 500 msecs after the start of inflow of the inflating gas from the inflator 39 is 44 kPa, as illustrated in the graph of FIG. 15. In the air bag 41, on the other hand, the internal pressure at 3 secs after the start of inflow of the inflating gas is 20 kPa. When the vehicle is laterally turned by an impact on the side of the vehicle, therefore, the internal pressure of the air bag body 42 is sufficiently maintained. As a result, the air bag 41 can properly restrain the passenger. The reason will be described in the following. This is because the vehicle usually stops turning within about 3 secs after an impact, even if the vehicle is laterally turned by the impact.

Here, the air bag of a comparison, as illustrated in the graph of FIG. 15, has a construction similar to that of the embodiment, and is connected to the inflator by a construction similar to that of the embodiment. In the air bag of the comparison, however, the coating layer is made thinner than that of the coating layer 53 of the embodiment. In the comparison, a coating agent of silicon rubber is applied in an amount of 60 g/m². In the air bag of the comparison, as seen from the graphical illustration, the internal pressure at 500 msecs after the start of inflow of the inflating gas is 16 kPa. In the air bag of the comparison, moreover, the internal pressure at 1,200 msecs after the start of inflow of the inflating gas is 0 kPa. Here, in the air bag of the comparison, the inflating gas has leaked from the boundary between the expanding portion and the joint portion in the air bag body. In the air bag of the comparison, therefore, the internal pressure has not been maintained at a high level.

In the air bag 41 of the embodiment, on the other hand, the internal pressure at 500 msecs after the start of inflow of the inflating gas from the inflator 39 is 44 kPa. In the air bag 41 of the embodiment, moreover, the internal pressure at 3 secs after the start of inflow of the inflating gas is 20 kPa. In other words, in the air bag 41 of the embodiment, the internal pressure at 3 secs after the start of inflow of the inflating gas is maintained at 45% of the internal pressure at 500 msecs after the start of inflow. As the internal pressure of the inflating gas from the start of inflow of the inflating gas, the internal pressure at 3 secs after the inflow start may be maintained at 30% or more of the internal pressure at 500 msecs after the start of inflow. The reason will be described in the following. When the vehicle is laterally turned by an impact or the like from its side, the vehicles turn is usually stopped within about 3 secs after the impact application. If the internal pressure of the air bag is sufficiently maintained until the vehicle stops turning, the air bag can thus restrain the passenger properly.

Moreover, the air bag may be constructed such that the internal pressure at 500 msecs after the start of inflow of the inflating gas is maintained at 10 kPa or higher. This is because the internal pressure of the air bag until 3 secs after an impact can be maintained at 3 kPa or more.

Here, the means for maintaining the internal pressure is exemplified not only by making thick the coating layer 53, but also by the following means. Specifically, an inflator having a long discharging time period of the inflating gas can be used to maintain the internal pressure, even if the inflating gas leaks. Alternatively, a resin sheet member having flexibility may be thermally bonded in a gas-tight state to form the air bag. In the case of using an inflator for discharging the inflating gas for a long time, however, it is difficult to maintain the flow rate of the inflating gas at the beginning of the expansion. For the air bag in the gas-tight state, on the other hand, a sufficient strength has to be retained to prevent any burst at the completion of the expansion. Considering the fact that the internal pressure can be maintained by a simple and safe construction, the necessity may be satisfied by making the adjustment of thickening the coating layer 53, as in the embodiment.

In the embodiment, on the other hand, the bag-shaped air bag 41 is formed by the hollow-weaving method. However, an air bag may be formed by stitching up an ordinary plain-woven fabric or the like, and then by applying a coating layer thickly to the stitches, the surface, and the back of the fabric. Moreover, the air bag may also be formed by adhering the woven fabric into a bag shape without any stitching and then by applying the coating layer thickly to the surface and to the back of the fabric. However, the stitching step or the adhering step can be eliminated if the air bag is formed by the hollow-weaving method, as in the embodiment. As a result, the number of steps for manufacturing the air bag can be reduced in the embodiment.

Moreover, the air bag 41 of the embodiment is used in the side air bag device M, which is arranged from the front pillar portion PF to the roof side rail portion R. However, the air bag may be arranged from the rear pillar portion or the center pillar portion PF to the roof side rail portion R.

What is claimed is:

1. An air bag for a side air bag device comprising:
   (a) an air bag body covering at least a portion of a window upon deployment, said air bag body having a bag portion with an expanding portion and a gas inlet portion;
   (b) a joint cylinder connected to an inflator supplying an inflating gas and a mounting member peripherally mounted on the opening of the air bag body, wherein inflating gas flows into the bag portion, and wherein the gas inlet portion of the bag portion connects the joint cylinder to the expanding portion;
   (c) an inner tube positioned within the gas inlet portion, said inner tube having first and second ends with the first end connected to the inflator, said second end being located adjacent to the expanding portion, and wherein said inner tube has an inner circumferential surface coated with a heat resistance enhancing layer;
   (d) wherein said air bag is folded and accommodated over a roof side rail adjacent a peripheral edge of the window;
   (e) wherein said air bag is developed and expanded down over the window when inflating gas flows in;
   (f) wherein the internal pressure of the inflating gas at 3 sec. after the start of gas inflow is maintained at 30% or more of the internal pressure at 500 msec. after the start of gas inflow;
   (g) wherein said air bag, is formed by hollow weaving; and
   (h) wherein the air bag is provided with a heat resistance coating layer.

2. The air bag according to claim 1, wherein the internal pressure at 500 msecs after the inflow start of the inflating gas is maintained at 10 kPa or more.

3. The air bag according to claim 1, wherein the internal pressure is maintained by said coating layer.

4. The air bag according to claim 1, wherein the inner tube has an outside diameter that is smaller in dimension than an inner circumferential side of the gas inlet portion such that inflation of the inner tube does not fully inflate the gas inlet portion.

5. The air bag according to claim 1, wherein the gas inlet portion is arranged within a pillar and covered, and the second end of the inner tube is arranged at a roof side rail portion when the air bag is in the folded position, and wherein a door of the cover can be pushed open by inflating the inner tube without filling the entire gas inlet portion.

6. The air bag according to claim 1, wherein the expanding portion is divided into a plurality of cells arranged across the expanding portion and defined by a plurality of binding portions which interconnect an interior side wall portion of the bag portion to an exterior side wall portion of the bag portion, said plurality of cells having a first cell located nearest the inflator and rearward cells spaced from the first cell, wherein the second end of the inner tube directs inflating gas above the plurality of binding portions.

7. An air bag for a side air bag device comprising:
 (a) an air bag body covering at least a portion of a window upon deployment, said air bag body having a bag portion with an expanding portion and a gas inlet portion;
 (b) a source of inflating gas operatively connected to the gas portion so that inflating gas flows into the bag portion;
 (c) an inner tube positioned within the gas inlet portion, said inner tube having first and second ends with the first end connected to the source of inflating gas, said second end being located adjacent to the expanding portion, and wherein said inner tube has an inner circumferential surface coated with a heat resistance enhancing layer;
 (d) wherein said air bag is folded and accommodated over a roof side rail adjacent a peripheral edge of the window;
 (e) wherein said air bag is developed and expanded down over the window when inflating gas flows in; and
 (f) wherein the internal pressure of the inflating gas at 3 sec. after the start of gas inflow is maintained at 30% or more of the internal pressure at 500 msec. after the start of gas inflow.

* * * * *